UNITED STATES PATENT OFFICE 2,311,607

PREPARATION OF STYRENE COPOLYMERS

Gerald H. Coleman and John W. Zemba, Midland, Mich., assignors to The Dow Chemical Company, Midland, Mich., a corporation of Michigan No Drawing. Application January 17, 1940, Serial No. 314,280

4 Claims. (Cl. 260—78)

This invention concerns an improved method for the preparation of certain co-polymers of styrene.

In the co-pending applications of Britton, Marshall, and Le Fevre, Serial No. 217,224, filed July 2, 1938 and Serial No. 324,230, filed March 15, 1940, are described certain new polymeric products which are prepared by polymerizing styrene in the presence of certain unsaturated esters. These products are characterized by being substantially insoluble and non-swelling in common organic solvents such as benzene, toluene, ethanol, acetone, carbon tetrachloride, petroleum ether, ethyl acetate, etc. They are also characterized by their friability and opaque, white appearance, in contrast to the tough, transparent, glass-like co-polymers previously known. The new products, however, are usually capable of being molded to form clear, transparent molded articles which are substantially insoluble and non-swelling in organic solvents and which are somewhat more resistant to distortion by heat than is molded polystyrene. These products are herein referred to as "co-polymers of styrene," although, as stated in the above-mentioned application, their exact molecular structure is not definitely known.

According to said co-pending application, the new insoluble and non-swelling co-polymers are prepared by polymerizing at a temperature below about 110° C., a mixture of monomeric styrene and an unsaturated ester co-polymerizing agent containing at least two

groups in the molecule. Examples of such esters are diallyl maleate, allyl cinnamate, diallyl oxalate, di-(2-chloroallyl) adipate, trimethallyl phosphate, cinnamyl acrylate, 2-chloroallyl acrylate, ethylene dicinnamate, 2 - chloroallyl furoate, the dicinnamate of 1.4-dioxanediol-2.3, methallyl cinnamate, crotyl crotonate, allyl methacrylate, 2-chloroallyl crotonate, 2-ethylallyl vinylacetate, diallyl succinate, etc. The product initially obtained by operating in this manner is a mixture comprising the desired insoluble, non-swelling type of co-polymer and more or less of a tough, glass-like type of co-polymer which is capable of being swelled in benzene and similar aromatic hydrocarbon solvents. The proportions in which the two types of co-polymers are formed depend upon a number of factors, including the particular co-polymerizing agent employed, the conditions under which the co-polymerization is carried out, the purity of the styrene, etc., but seldom is the insoluble and non-swelling product obtained as the sole product.

We have now found that the yield of the insoluble, non-swelling co-polymer may be considerably increased by carrying out the co-polymerization in the presence of a polymerization inhibitor for the glass-like, swelling type of co-polymer. Apparently the poor yields of the non-swelling product heretofore obtained are due to the higher rate of formation of the glass-like swelling type of product. Accordingly, by retarding or inhibiting the formation of the latter, co-polymerization to form the insoluble, non-swelling co-polymer is permitted to proceed more nearly to completion with resultant increased yield of the desired product. The inhibitors which we have found suited to this purpose are those materials which are capable of inhibiting the polymerization of substantially pure monomeric styrene. Many such materials are known in the art, for example, phenyl-naphthylamine, diaminoazobenzene, p-phenylenediamine, etc. The organic inhibitors for the polymerization of styrene appear to be best suited for use according to the invention, and a preferred group of such inhibitors includes phenyl-alphanaphthylamine, 2-(4 - phenylazo - phenoxy) ethanol, arylazo-substituted phenols, and arylazo-substituted arylamines.

In preparing the insoluble and non-swelling type of styrene co-polymer according to the invention, a mixture of monomeric styrene and an unsaturated ester containing at least two

groups is polymerized by heating at a temperature below about 110° C., preferably at 50°-85° C. in the presence of an amount of the inhibitor sufficient to retard substantially the formation of the glass-like swelling type of co-polymer but insufficient to cause appreciable inhibition of the formation of the insoluble, non-swelling product. Such optimum proportion of inhibitor varies with the temperature of polymerization, the particular co-polymerizing agent, and the proportion in which it is used, the particular inhibitor employed, etc. but in general will be found to be between about 0.01 and about 1.0 per cent by weight of the styrene. The unsaturated ester co-polymerizing agent is usually employed in a proportion between about 1.0 and about 25.0 per cent by weight of the styrene, although other proportions may be employed. A preferred group of such co-polymerizing agents includes the low molecular weight unsaturated mono-carboxylic acid and poly carboxylic acid esters of allyl, 2-methallyl, and 2-chloroallyl alcohols e. g. diallyl maleate, di-(2-chloroallyl)-oxalate, methallyl cinnamate, allyl crotonate, 2-chloroallyl furoate, dimethallyl succinate, etc.

The principle of the present invention may also be applied to the improved process for preparing the insoluble and non-swelling type of styrene co-polymer disclosed in the co-pending application of J. W. Zemba and G. H. Coleman, Serial No. 217,226, filed July 2, 1938, wherein the co-polymerization is carried out in the presence of an insoluble and non-swelling co-polymer "seed" in order to obtain an increased yield of the desired product.

The following examples illustrate several ways in which the principle of the invention has been applied, but are not to be construed as limiting the same.

EXAMPLE 1

The following table presents data illustrating the preparation of the insoluble and non-swelling type of styrene co-polymer in the presence of several different inhibitors for the polymerization of styrene. In each experiment, a mixture of 50 parts by weight of commercial monomeric styrene, 2.5 parts of diallyl maleate, and the indicated proportion of the inhibitor was polymerized by heating at a temperature of about 80° C. for 336 hours. The last column in the table gives the approximate amount of the insoluble, non-swelling type of co-polymer present in the entire polymerized mass, the remainder being the glass-like, swelling type of product.

Table I

| Expt. No. | Inhibitor | | Insoluble nonswelling co-polymer |
|---|---|---|---|
| | Name | Per cent | Per cent |
| 1 | | | 15 |
| 2 | 1-(4-ethoxy-phenylazo)-2-naphthol | 0.3 | 30 |
| 3 | 2-(4-phenylazo-phenoxy) ethanol | 0.5 | 50 |
| 4 | 1-phenylazo-2-naphthylamine | 0.3 | 75 |
| 5 | Phenyl-alpha-naphthylamine | 0.1 | 75 |

EXAMPLE 2

A mixture of 50 parts of monomeric styrene, 2 parts of allyl cinnamate, and 0.1 part of 2,4-diphenylazo-phenol was polymerized by heating at a temperature of about 80° C. for 720 hours. The polymerizate obtained consisted of approximately 95 per cent of the opaque, white, insoluble and non-swelling type of co-polymer, the remaining 5 per cent being a partially polymerized viscous liquid. A mixture of 50 parts of styrene and 4 parts of allyl cinnamate, when polymerized in the absence of an inhibitor at 80° C. for 720 hours, yielded a hard resinous product which contained only 20 per cent of the insoluble, non-swelling type of co-polymer.

EXAMPLE 3

Mixtures of purified monomeric styrene and several different unsaturated ester co-polymerizing agents were polymerized in the presence of a number of different inhibitors for the polymerization of styrene. The experimental data together with the yields of insoluble non-swelling co-polymer obtained are tabulated below:

Table II

| Expt. No. | Co-polymerizing agent | | Inhibitor | | Polymerization | | Insoluble, nonswelling co-polymer |
|---|---|---|---|---|---|---|---|
| | Name | Percent | Name | Percent | Time | Temp. | |
| | | | | | Hours | °C. | Percent |
| 1 | Diallyl maleate | 6 | | | 168 | 80 | 70 |
| 2 | Do | 6 | 2-phenyl-4,6-di-phenylazo-phenol | 0.05 | 168 | 80 | 100 |
| 3 | Do | 6 | 2-phenylazo-6-phenyl-phenol | 0.2 | 168 | 80 | 95 |
| 4 | Do | 6 | 2,6-di-phenylazo-4-phenyl-phenol | 0.1 | 168 | 80 | 100 |
| 5 | Do | 9 | | | 168 | 80 | 90 |
| 6 | Do | 9 | 2,4-di-phenylazo-phenol | 0.1 | 168 | 80 | 100 |
| 7 | Do | 9 | 2,6-di-phenylazo-4-phenol | 0.1 | 168 | 80 | 100 |
| 8 | Do | 9 | Phenyl-alpha-naphthyl-amine | 0.1 | 168 | 80 | 95 |
| 9 | Do | 7.5 | | | 168 | 80 | 80 |
| 10 | Do | 7.5 | 4-amino-azobenzene | 0.1 | 168 | 80 | 100 |
| 11 | Do | 7.5 | 2-phenyl-4-(2-xenylazo)-aniline | 0.1 | 168 | 80 | 95 |
| 12 | Do | 7.5 | 4-methoxy-3-phenylazo-diphenyl | 0.1 | 168 | 80 | 90 |
| 13 | Ethylene di-cinnamate | 9 | | | 168 | 80 | 5 |
| 14 | Do | 9 | 2,4-diphenylazo-phenol | 0.1 | 168 | 80 | 70 |
| 15 | Di-(2-chloroallyl)-succinate | 9 | | | 168 | 80 | 1 |
| 16 | Do | 9 | do | 0.1 | 168 | 80 | 95 |
| 17 | Di-(2-chloroallyl)-adipate | 9 | | | 168 | 80 | 1 |
| 18 | Do | 9 | do | 0.1 | 168 | 80 | 30 |

Other modes of applying the principle of our invention may be employed instead of the one explained, change being made as regards the method herein disclosed, provided the step or steps stated by any of the following claims or the equivalent of such stated steps be employed.

We therefore point out and distinctly claim as our invention:

1. The method of preparing a white, opaque, friable, and granular styrene co-polymer which is substantially insoluble and non-swelling in benzene, which comprises polymerizing a mixture of styrene and a minor proportion of diallyl maleate at a temperature below about 110° C. in the presence of from about 0.01 to about 1.0 per cent by weight of 2,4-diphenylazo-phenol.

2. The method of preparing a white, opaque, friable, and granular styrene co-polymer which is substantially insoluble and non-swelling in benzene, which comprises polymerizing a mixture of styrene and a minor proportion of allyl cinnamate at a temperature below about 110° C. in the presence of from about 0.01 to about 1.0 per cent by weight of 2,4-diphenylazo-phenol.

3. The method of preparing a white, opaque, friable, and granular styrene co-polymer which is substantially insoluble and non-swelling in benzene, which comprises polymerizing a mixture of styrene and a minor proportion of di-(2-chloroallyl) succinate at a temperature below about 110° C. in the presence of from about 0.01 to about 1.0 per cent by weight of 2,4-diphenylazo-phenol.

4. In a method wherein a white, opaque, friable, and granular polymerization product, which is substantially insoluble and non-swelling in benzene, is prepared by polymerizing a mixture comprising styrene and a minor proportion of an unsaturated organic ester which contains at least two olefinic linkages at a temperature below 110° C.; the step which consists in carrying out the polymerization in the presence of an inhibitor for the polymerization of styrene in amount sufficient to inhibit the formation of the normal glass-like polymer, said amount being less than about 1.0 per cent and said inhibitor being an organic nitrogen compound selected from the class consisting of phenyl-alpha-naphthyl-amine, 2-(4-phenylazo-phenoxy) ethanol, arylazo-arylamines and arylazo-phenols.

GERALD H. COLEMAN.
JOHN W. ZEMBA.